US009020187B2

(12) United States Patent
Pirchheim et al.

(10) Patent No.: US 9,020,187 B2
(45) Date of Patent: Apr. 28, 2015

(54) PLANAR MAPPING AND TRACKING FOR MOBILE DEVICES

(75) Inventors: Christian Pirchheim, Graz (AT); Gerhard Reitmayr, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 13/463,643

(22) Filed: May 3, 2012

(65) Prior Publication Data
US 2012/0300979 A1 Nov. 29, 2012

Related U.S. Application Data

(60) Provisional application No. 61/490,764, filed on May 27, 2011.

(51) Int. Cl.
G06K 9/00 (2006.01)
G06T 7/00 (2006.01)
G06T 7/20 (2006.01)

(52) U.S. Cl.
CPC ............. *G06T 7/0042* (2013.01); *G06T 7/2033* (2013.01)

(58) Field of Classification Search
None
See application file for complete search history.

(56) References Cited

U.S. PATENT DOCUMENTS

| 6,137,491 | A | 10/2000 | Szeliski |
| 7,167,189 | B2 | 1/2007 | Di Lelle et al. |
| 7,565,004 | B2 | 7/2009 | Hashimoto |
| 2010/0021065 | A1* | 1/2010 | Sibiryakov .................... 382/190 |
| 2010/0045701 | A1 | 2/2010 | Scott et al. |
| 2010/0284607 | A1 | 11/2010 | Van Den Hengel et al. |

FOREIGN PATENT DOCUMENTS

| JP | 2004198211 A | 7/2004 |
| JP | 2009156611 A | 7/2009 |

OTHER PUBLICATIONS

Kümmerle, et al., "Large Scale Graph-based SLAM using Aerial Images as Prior Information," Autonomous Robots—AROBOTS, vol. 30, No. 1, pp. 25-39, 2011.
Lourakis, et al., "Chaining Planar Homographies for Fast and Reliable 3D Plane Tracking,", IEEE, ICPR 2006. 18th International Conference on Pattern Recognition, pp. 582-586, 2006.
Ruiz, et al., "Practical Planar Metric Rectification," in In Proc. BMVC, 2006, Edinburgh, UK, pp. 1-10, Sep. 4-7, 2006.
Thrun, et al., "The GraphSLAM Algorithm with Applications to Large-Scale Mapping of Urban Structures," International Journal of Robotics Research, vol. 25, No. 5-6, pp. 403-429, May-Jun. 2006.

(Continued)

*Primary Examiner* — Atiba O Fitzpatrick
(74) *Attorney, Agent, or Firm* — Silicon Valley Patent Group LLP

(57) ABSTRACT

Real time tracking and mapping is performed using images of unknown planar object. Multiple images of the planar object are captured. A new image is selected as a new keyframe. Homographies are estimated for the new keyframe and each of a plurality of previous keyframes for the planar object that are spatially distributed. A graph structure is generated using the new keyframe and each of the plurality of previous keyframes and the homographies between the new keyframe and each of the plurality of previous keyframes. The graph structure is used to create a map of the planar object. The planar object is tracked based on the map and subsequently captured images.

26 Claims, 8 Drawing Sheets

(56) References Cited

OTHER PUBLICATIONS

Eade E., et al., "Monocular graph SLAM with complexity reduction", Intelligent Robots and Systems (IROS), 2010 IEEE/RSJ International Conference on IEEE, Piscataway, NJ, USA, Oct. 18, 2010. pp. 3017-3024, XP031920068, DOI:10.1109/IROS.2010.5649205 ISBN: 978-1-4244-6674-0 the whole document.

International Search Report and Written Opinion—PCT/US2012/036624—ISA/EPO—Jul. 19, 2012.

Kim et al., "Robust Vision-Based Autonomous Navigation against Environment Changes", Intelligent Robots and Systems. 2008. IROS 2008. IEEE/RSJ International Conference on IEEE, Piscataway, NJ, USA, Sep. 22, 2008, pp. 696-701. XP031348633, DOI:10.1109/IROS.2008.4651101 ISBN: 978-1-4244-2057-5 p. 697 p. 699.

Klein G., et al., "Parallel Tracking and Mapping on a Camera Phone", Mixed and Augmented Reality 2009, ISMAR 2009. 8th IEEE International Symposium on IEEE, Piscataway, NJ, USA, Oct. 19, 2009, pp. 83-86, XP031568942, ISBN: 978-1-4244-5390-0 the whole document.

Lovegrove S., et al., "Real-Time Spherical Mosaicing Using Whole Image Alignment", Sep. 5, 2010, Computer Vision A ECCV 2010, Springer Berlin Heidelberg, Berlin, Heidelberg, pp. 73-86, XP019150726, ISBN: 978-3-642-15557-4 abstract section 2.

Pirchheim C., et al., "Homography-based planar mapping and tracking for mobile phones", Mixed and Augmented Reality (ISMAR), 2011 10th IEEE International Symposium on IEEE, Oct. 26, 2011, pp. 27-36, XP032157258, DOI: 10.1109/ISMAR.2011.6092367 ISBN: 978-1-4577-2183-0 the whole document.

Wagner D., et al., "Real-time panoramic mapping and tracking on mobile phones", Virtual Reality Conference (VR) 2010 IEEE, IEEE, Piscataway, NJ USA, Mar. 20, 2010, pp. 211-218, XP031656098, ISBN: 978-1-4244-6237-7 the whole document.

Teshima T., et al.,"Real Time Method to Detect the Waving Drive from a Single Camera", Transactions of the Institute of Electrical Engineers of Japan, Electronics, Information and System Society, Sep. 1, 2009, vol. 129, No. 9, pp. 1714-1723.

Malis, E., et al., "Deeper understanding of the homography decomposition for vision-based control," INRIA—Institut National de Recherche en Informatique et en Automatique (FR), No. 6303, Sep. 2007, 93 pages.

Davison, A.J., et al., "MonoSLAM: Real-Time Single Camera Slam," IEEE Transactions on Pattern Analysis and Machine Intelligence, vol. 29, No. 6, Jun. 2007, pp. 1-16.

Faugeras O., et al., "Motion and Structure from Motion in a Piecewise Planar Environment " INRIA Rocquencourt, Jun. 1988, pp. 1-23.

Gee, A.P., et al., "Discovering Higher Level Structure in Visual SLAM," IEEE Transactions on Robotics, vol. 24, Issue 5, Oct. 10, 2008, 10 pages.

Klein G., et al., "Parallel Tracking and Mapping for Small AR Workspaces," 6th IEEE and ACM International Symposium on Mixed and Augmented Reality, 2007. ISMAR 2007. pp. 225-234.

Lee, W., et al., "Point-and-Shoot for Ubiquitous Tagging on Mobile Phones", 2010 9th IEEE International Symposium on Mixed and Augmented Reality (ISMAR), Oct. 13-16, 2010, pp. 57-64, XP031807035, ISBN: 978-1-4244-9343-2.

Loop, C., et al., "Computing Rectifying Homographies for Stereo Vision," IEEE Conference on Computer Vision and Pattern Recognition, vol. 1, pp. 125-131, Jun. 23-25, 1999, Fort Collins, Colorado, USA.

Simon, G., et al., "In-Situ 3D Sketching Using a Video Camera as an Interaction and Tracking Device," 31st Annual Conference of the European Association for Computer Graphics—Eurographics 2010, May 3, 2010, 4 pages.

Ventura, J., et al., "Online Environment Model Estimation for Augmented Reality," IEEE International Symposium on Mixed and Augmented Reality 2009, Science and Technology Proceedings, Oct. 19-22, 2009, Orlando, Florida, USA, pp. 103-106.

* cited by examiner

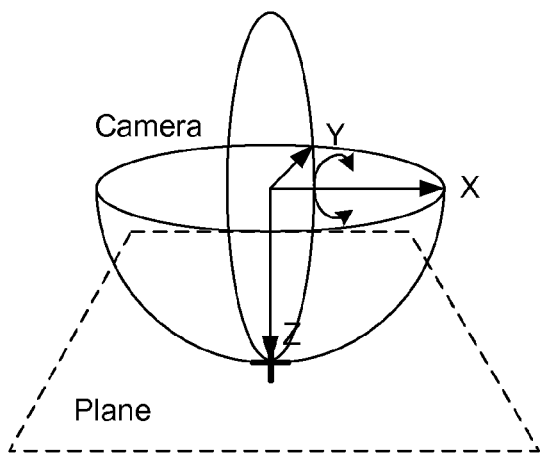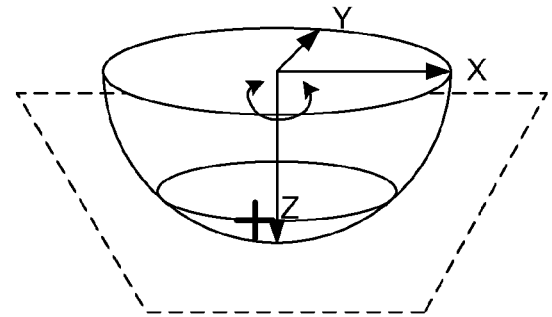
Fig. 6A　　　　　　　　Fig. 6B
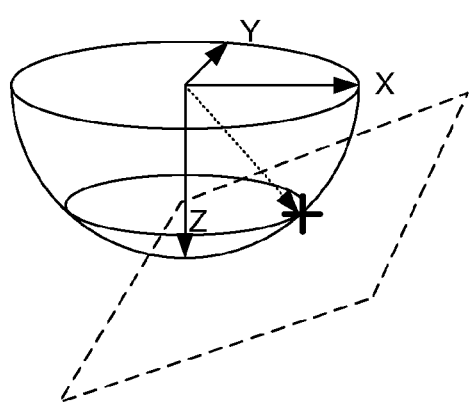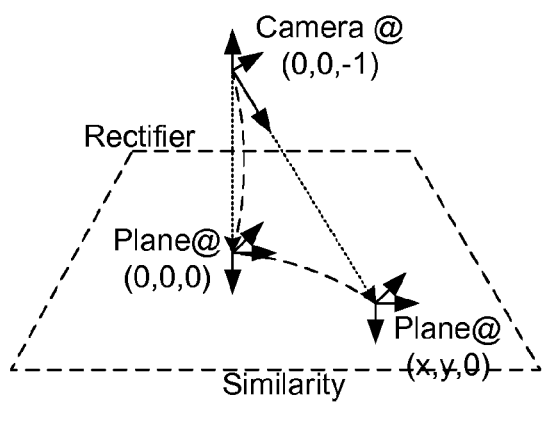
Fig. 6C　　　　　　　　Fig. 6D

PLANAR MAPPING AND TRACKING FOR MOBILE DEVICES

CROSS-REFERENCE TO RELATED APPLICATION(S)

This application claims priority under 35 USC 119 to provisional application No. 61/490,764, filed May 27, 2011, entitled "Planar Mapping and Tracking for Mobile Phones," which is assigned to the assignee hereof and which is incorporated herein by reference.

BACKGROUND

1. Background Field

Embodiments of the subject matter described herein are related generally to tracking and mapping, and more particularly to vision based mapping and tracking with a mobile device.

2. Relevant Background

In recent years, model-based tracking has become state-of-the-art on mobile devices. Natural feature detection and tracking of a-priori known well-textured images in real-time have been shown by multiple groups and these techniques have found their way into commercial applications and software development kits.

Mapping of a-priori unknown scenes in full three-dimensions and tracking in six degree of freedom (6DOF) with a monocular camera still remains a difficult task, particularly on mobile devices, such as cellular phones or smart phones. Classical Extended Kalman filter (EKF) based approaches known from the robotics community are currently computationally infeasible. Only the well-known Parallel Tracking and Mapping (PTAM) system has been shown to run as a prototype on current smart phones. The PTAM mapping method, however, is based on bundle adjustment techniques, which scale badly with increasing map sizes due to high computational demands.

SUMMARY

Real time tracking and mapping is performed using images of unknown planar object. Multiple images of the planar object are captured. A new image is selected as a new keyframe. Homographies are estimated for the new keyframe and each of a plurality of previous keyframes for the planar object that are spatially distributed. A graph structure is generated using the new keyframe and each of the plurality of previous keyframes and the homographies between the new keyframe and each of the plurality of previous keyframes. The graph structure may be a tree based graph structure and the new keyframe and each of the plurality of previous keyframes are nodes and the homographies between the new keyframe and each of the plurality of previous keyframes are edges between the nodes. The graph structure is used to create a map of the planar object. The planar object is tracked based on the map and subsequently captured images.

In one aspect, a method includes capturing multiple images of a planar object; selecting a new image as a new keyframe; calculating homographies between the new keyframe and each of a plurality of previous keyframes for the planar object that are spatially distributed; generating a graph structure using the new keyframe and each of the plurality of previous keyframes and the homographies between the new keyframe and each of the plurality of previous keyframes; using the graph structure to create a map of the planar object; and tracking the planar object based on the map and subsequently captured images.

In one aspect, an apparatus includes a camera capable of capturing multiple images of a planar object; and a processor coupled to the camera, the processor configured to select a new image as a new keyframe, calculate homographies between the new keyframe and each of a plurality of previous keyframes for the planar object that are spatially distributed, generate a graph structure using the new keyframe and each of the plurality of previous keyframes and the homographies between the new keyframe and each of the plurality of previous keyframes, use the graph structure to create a map of the planar object, and track the planar object based on the map and subsequently captured images.

In one aspect, an apparatus includes means for capturing multiple images of a planar object; means for selecting a new image as a new keyframe; means for calculating homographies between the new keyframe and each of a plurality of previous keyframes for the planar object that are spatially distributed; means for generating a graph structure using the new keyframe and each of the plurality of previous keyframes and the homographies between the new keyframe and each of the plurality of previous keyframes; means for using the graph structure to create a map of the planar object; and means for tracking the planar object based on the map and subsequently captured images.

In one aspect, a non-transitory computer-readable medium including program code stored thereon includes program code to select from captured multiple images of a planar object a new image as a new keyframe; program code to calculate homographies between the new keyframe and each of a plurality of previous keyframes for the planar object that are spatially distributed; program code to generate a graph structure using the new keyframe and each of the plurality of previous keyframes and the homographies between the new keyframe and each of the plurality of previous keyframes; program code to use the graph structure to create a map of the planar object; and program code to track the planar object based on the map and subsequently captured images.

BRIEF DESCRIPTION OF THE DRAWING

FIGS. 6A, 6B, 6C, and 6D illustrate the geometric interpretation of the planar image rectification parameterization.

DETAILED DESCRIPTION

Figure 1:
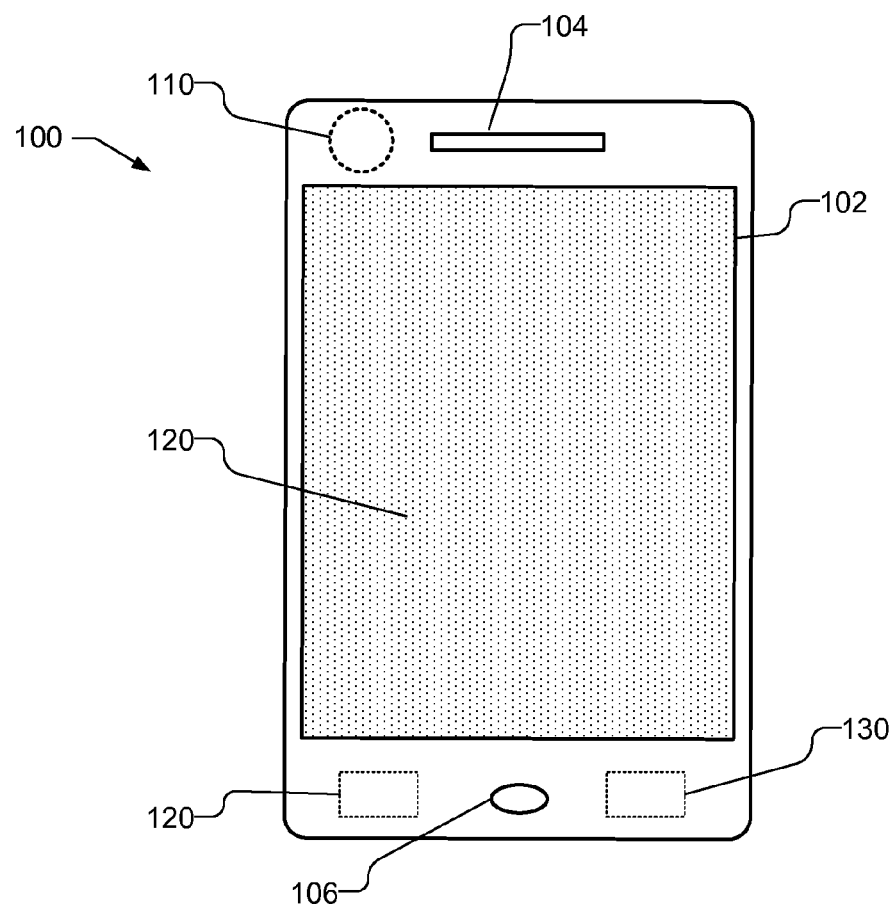
FIG. 1 illustrates a mobile device capable of real-time pose tracking and mapping using captured images of an unknown, textured, planar object.

FIG. 1 illustrates a mobile device 100 capable of real-time pose tracking and mapping of an unknown, textured, planar object using captured images, e.g., obtained from a camera 110, which may be a calibrated monocular camera. The mobile device 100 uses a mapping approach based on keyframes and plane-induced homographies between the keyframes. The planar reconstruction problem of estimating the keyframe poses is resolved with an image rectification process essentially in linear time in the number of inter-keyframe homographies measured. Pose tracking uses the continuously extended and refined planar point maps to deliver robustly estimated poses.

The mobile device 100 is illustrated as including a housing 101, a display 102, which may be a touch screen display, as well as a speaker 104 and microphone 106. The display 102 may illustrate images captured by the camera 110, maps, or any other desired material. The mobile device 100 includes a tracking component 120 and a mapping component 130. The tracking component 120 tracks the camera pose by processing the image stream of a planar environment from the camera 110 and computing the camera poses. The tracking component 120 provides selected keyframes to the mapping component in a keyframe candidate queue. The mapping component 130 processes the keyframes to generate a map that is enlarged and refined as new views of the captured planar scene become available. The mapping component 130 computes plane-induced homographies between keyframes and organizes their relations in a dedicated pose graph. The mapping component 130 provides a map of points and keyframes to the tracking component 120, with which the tracking component 120 tracks the camera pose. Of course, the mobile device 100 may include additional components that are not necessarily related to the present disclosure.

As used herein, a mobile device refers to any portable electronic device such as a cellular or other wireless communication device, personal communication system (PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term "mobile device" is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile device" is intended to include all electronic devices, including wireless communication devices, computers, laptops, tablet computers, smart phones etc. which are capable of capturing images used in pose tracking and mapping.

Figure 2:
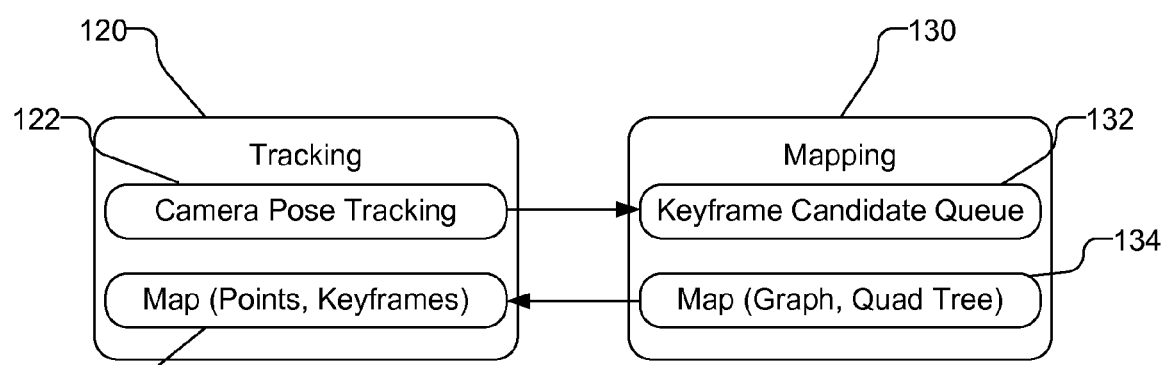
FIG. 2 illustrates the tightly coupled tracking component and mapping component used by mobile device for pose tracking and mapping.

FIG. 2 illustrates the tightly coupled tracking component 120 and mapping component 130 used by mobile device 100 for pose tracking and mapping. As illustrated in FIG. 2, the tracking component 120 performs the camera pose tracking 122 by processing the image stream of the calibrated monocular camera 110 and computing the camera poses, e.g., in six-degrees of freedom (6DOF). Camera pose tracking 122 discretely selects keyframes from the image stream and provides the selected keyframes to the mapping component 130 in a keyframe candidate queue. The mapping component 130 processes the keyframes to generate a persistent map 134 that is enlarged and refined over time, e.g., in a continuous fashion, as new views of the planar scene become available. Between keyframes, plane-induced homographies are computed and their relations are organized in a dedicated pose graph. The mapping component 130 provides a planar map 124 of the points organized in a quad tree, keyframes, and homographies organized in a graph to the tracking component 120 for tracking.

Figure 3:
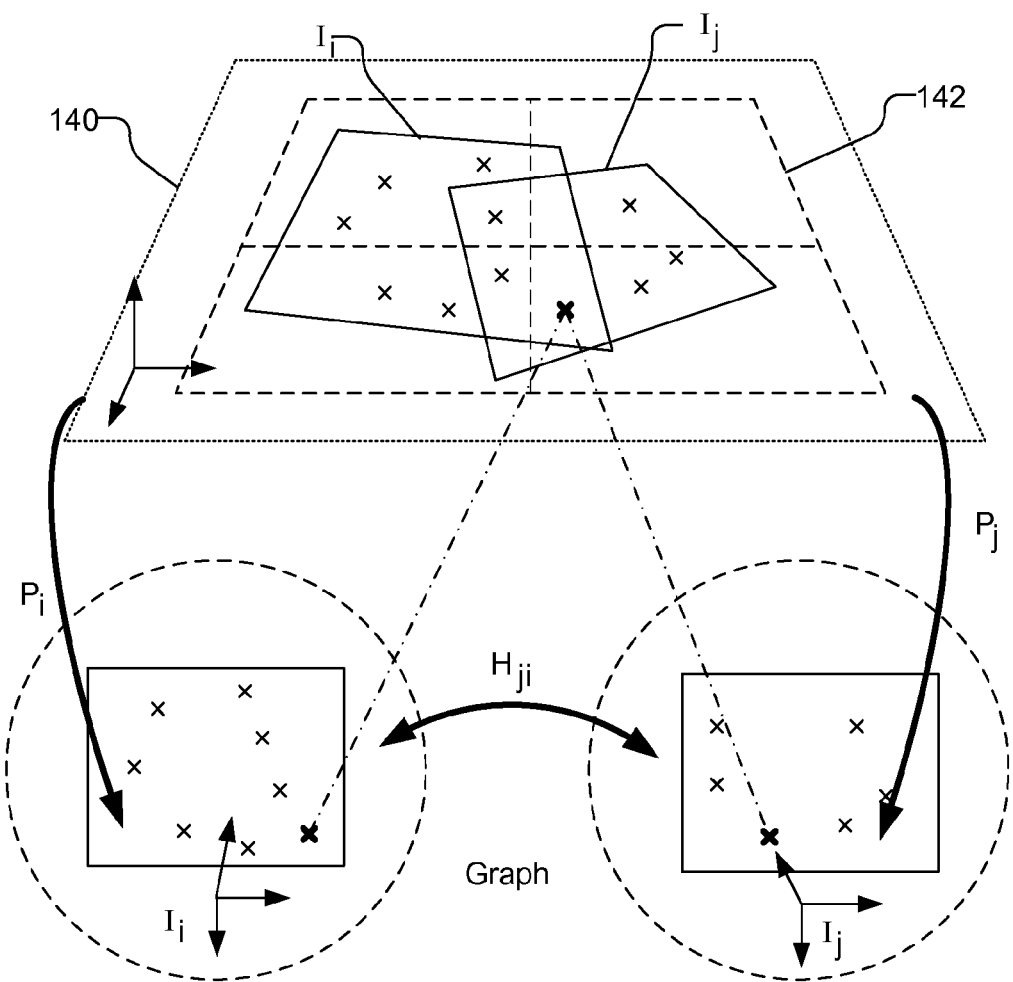
FIG. 3 illustrates a planar map consisting of points within two keyframes organized in a quad tree and the homography between the two keyframes.

FIG. 3, by way of example, illustrates a planar map 140 consisting of points within two keyframes $I_i$, $I_j$ that is organized in a quad tree 142. Each point in a keyframe is illustrated in FIG. 3 as an "x". The keyframes provide salient image measurements and are related with the planar map 140 via camera poses $P_i$ and $P_j$, respectively. The keyframes show diverse views of the two-dimensional (2D) scene and are used to compute plane-induced homographies mapping pixels from one keyframe to another. Homographies H project points between keyframes I, e.g., as illustrated in FIG. 3, homography $H_{ji}$ project points between keyframes $I_i$, $I_j$. The resulting relations are managed in a pose graph, e.g., the keyframes and homographies are stored as nodes and edges in a graph.

The mapping component 130 creates a map of an unknown textured planar scene observed by a set of keyframes passed from the tracking component 120. Maps are composed of three-dimensional (3D) points which sample the planar surface. Point observations originate either from salient keyframe corners or from feature matching as part of pose or homography estimation. The planar map points are organized in a quad tree resulting in fast point retrieval employed e.g. during search for unpopulated map regions on different scale levels.

Figure 4:
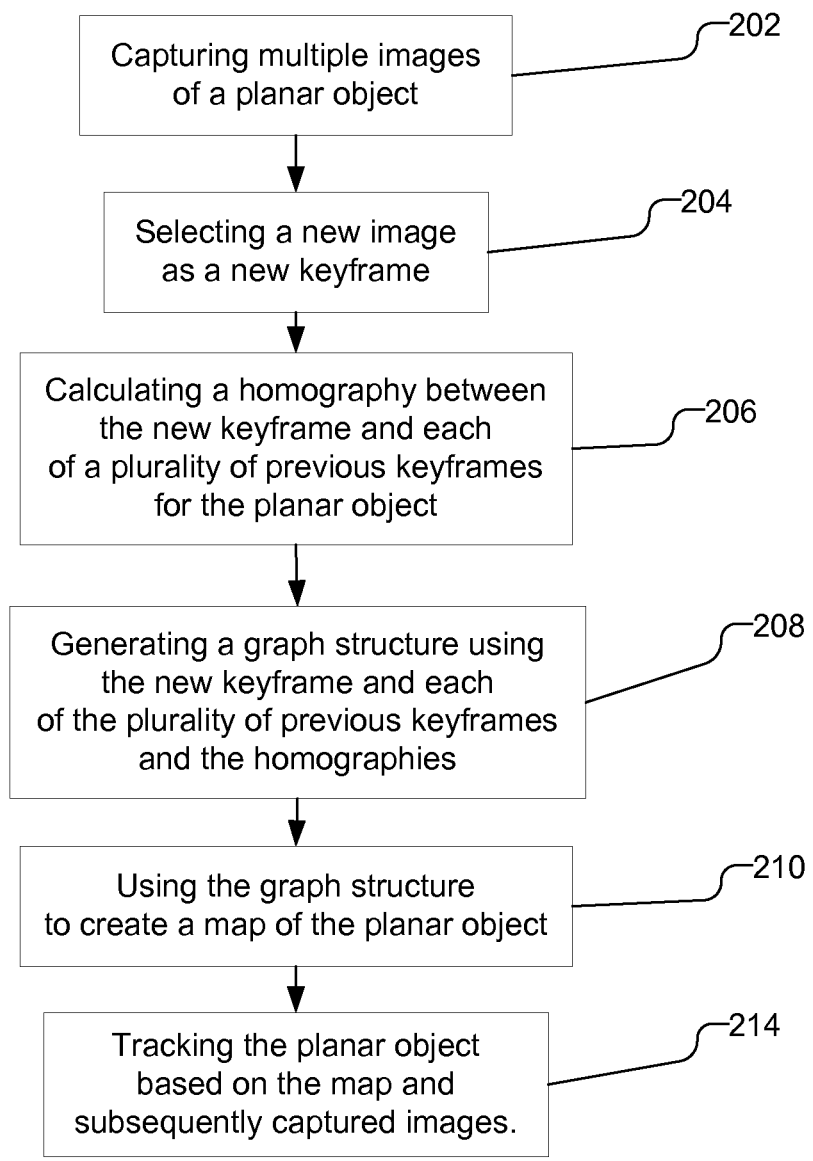
FIG. 4 is a flow chart illustrating a method of real-time pose tracking and mapping using captured images of a planar object.

FIG. 4 is a flow chart illustrating a method of real-time pose tracking and mapping using captured images of a planar object. As illustrated, multiple images of a planar object are captured (202), e.g., as frames in an image or video stream from camera 110. A new image is selected as a new keyframe (204). For example, if a new image yields a pose estimate with good quality, the new image may be compared to a plurality of previous keyframes (and candidate keyframes) to determine whether there is sufficient overlap, e.g., using a threshold. If there is sufficient overlap, the new image may be pushed onto the keyframe candidate queue 132 by the tracking component 120. Additionally, to select the new image as a keyframe, the new image may be verified to be on the planar object. Verification may be performed, e.g., by determining multiple poses for the new image based on poses of adjacent keyframes and corresponding homographies between the new image and the adjacent keyframes. The multiple poses may be compared to a tracker pose produced by tracking component 120 for the new image produced from tracking the new image with respect to the planar map. For example, the new image may be determined to be of the planar object if a sum of pairwise pose differences between the multiple poses and the tracker pose is within a threshold.

Figure 5:
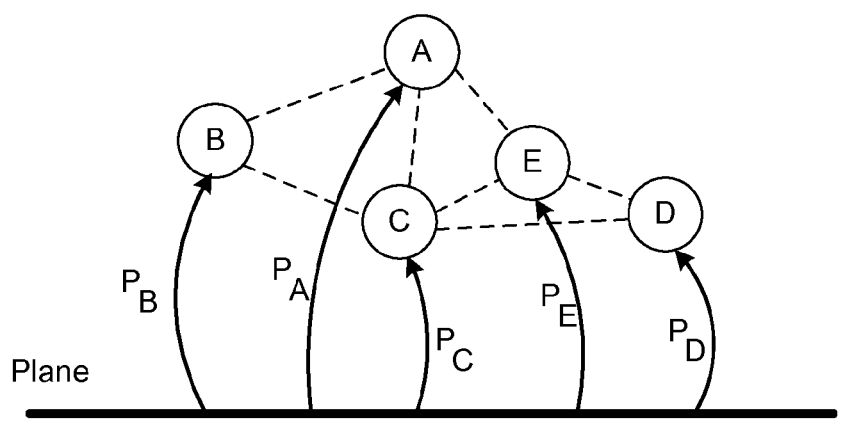
FIG. 5 illustrates a pose graph showing a plurality of keyframes as nodes of the graph and the homographies between the keyframes as the edges in the graph.

Homographies are calculated between the new keyframe and each of the plurality of previous keyframes for the planar object that are spatially distributed (206). A graph structure is generated using the new keyframe and each of the plurality of previous keyframes and the homographies between the new keyframe and each of the plurality of previous keyframes (208). FIG. 5, by way of example, illustrates a pose graph showing a plurality of keyframes (A, B, C, D, E) as nodes of the graph and the homographies between the keyframes as the edges in the graph, illustrated as broken lines. The pose of each keyframe is also illustrated with respect to the plane. For each homography $H_{j,i}$ estimate connecting a keyframe pair (i,j), a directed edge is added that connects the corresponding nodes $I_i$ and $I_j$. The graph is directed since homographies are estimated between keyframe pairs in both directions independently to obtain independent measurements. As illustrated in FIG. 5, homographies are calculated between a new keyframe E and each of the plurality of previous keyframes A, C, and D, which are spatially distributed, as opposed to being the immediately preceding keyframes.

The graph structure is used to create a map of the planar object (210). For example, the map may be created by selecting a reference keyframe from the plurality of previous keyframes and calculating a pose for the reference keyframe with respect to the planar object. The reference keyframe may be selected based on one of closeness to the new keyframe and closeness to a center node of the graph structure. Poses are calculated for the remaining set of keyframes using the pose of the reference keyframe and homographies between the reference keyframe and the remaining set of keyframes. The pose of the reference keyframe and the poses of the remaining set of keyframes may then be used to create the map. The planar object is then tracked based on the map and subsequently captured images (212).

Pose Graph

The inputs for mapping component 130 to generate the map are a set of keyframes and the homographies measured between them. The camera pose corresponding to keyframe $I_i$ is represented as a 3×4 transformation matrix $P=(R|t)$ representing the rigid transformation from the world coordinate system into the local camera coordinate system and subsequent projection. For some keyframe pairs (i,j), a homography $H_{j,i}$ is measured that maps points from keyframe $I_i$ to keyframe $I_j$ as illustrated in FIG. 3.

As illustrated in FIG. 4, these keyframe homography relations may be managed in a directed graph having keyframes as nodes and homographies as edges. As new keyframes are generated, new homographies to neighboring keyframes are measured and both are added to the graph. To preserve the planar map assumption, only keyframes on the same plane should be added. Thus, filtering is performed for keyframes that dominantly show views of outlier regions (e.g. regions depicting a different plane or a non-planar object) that would induce homographies that are not consistent with the main scene plane. For example, a consistency check may be employed on new keyframes. Candidate keyframes in the keyframe candidate queue 132 that fail a consistently check may be rejected. Candidate keyframes that pass the consistency check may be accepted and added to the graph.

Plane Estimation

To create a map of 3D points, the unknown camera poses $P_j$ corresponding to the keyframes are estimated. For the calculation of unknown keyframe camera poses with respect to the plane, a rectification algorithm may be employed. Two general approaches for solving the problem of estimating the plane using known homographies between images includes homography decomposition and image rectification. Homography decomposition refers to computing the camera motion given a homography matrix between two images of a planar object. Image rectification algorithms compute projective transformations from known epipolar geometry (or homographies in the planar case) which are applied to image pairs, aligning their epipolar lines, e.g. for the purpose of point matching in a 1D search space. A computationally efficient non-linear optimization scheme with only 2DOF that uses a variable number of homography measurements between a dedicated reference camera and other cameras may be used.

Cost Function and Parameterization

The mathematical formulation of the optimization scheme is provided. We define the scene plane to be located in the canonical position z=0 corresponding to the (x,y) plane. Points on the plane thus have a z-coordinate equal zero and can be written as (x, z, 0, 1) in homogeneous coordinates. The unknowns in the optimization are the camera poses $P_i$ relative to this plane. Under the assumption that all world points are located on the plane, camera poses can easily be re-formulated as 2D homographies by eliminating the third column of the pose matrix $P_i$:

$$\begin{pmatrix} u \\ v \\ 1 \end{pmatrix} (R|t) \begin{pmatrix} x \\ y \\ 0 \\ 1 \end{pmatrix} = (r_1 | r_2 | t) \begin{pmatrix} x \\ y \\ 1 \end{pmatrix}. \qquad \text{eq. 1}$$

The resulting pose homographies have the following important property based on the observation that their first and second columns are ortho-normal vectors, where $r_1$ and $r_2$ are the first and second column of R respectively:

$$C^T C = \begin{pmatrix} r_1^T \\ r_2^T \\ t^T \end{pmatrix} (r_1 | r_2 | t) = \begin{pmatrix} 1 & 0 & \cdots \\ 0 & 1 & \cdots \\ \cdots & \cdots & \cdots \end{pmatrix}. \qquad \text{eq. 2}$$

Additionally, given a pose homography $C_1$ and the homography $H_{2,1}$ mapping from camera $C_1$ to $C_2$, the corresponding pose homography $C_2$ can be computed as follows:

$$C_2 = H_{2,1} C_1. \qquad \text{eq. 3}$$

$C_1$ must observe the constraint equation 2. Moreover, by substituting equation 3 into equation 2, the following additional constraint for $C_1$ is obtained:

$$C_2^T C_2 = (C_1^T \; H_{21}^T)(H_{21} C_1) = \begin{pmatrix} 1 & 0 & \cdots \\ 0 & 1 & \cdots \\ \cdots & \cdots & \cdots \end{pmatrix}. \qquad \text{eq. 4}$$

We can formulate the constraint as a cost function on $C_1$ by enforcing that the off diagonal entries are 0 and the diagonal entries have the same value. Thus, we define the following cost function for one homography $H_{i,1}$:

$$(H_{i,1} C_1)^T (H_{i,1} C_1) = \begin{pmatrix} a_{11} & a_{12} & \cdots \\ a_{21} & a_{22} & \cdots \\ \cdots & \cdots & \cdots \end{pmatrix}, \qquad \text{eq. 5}$$

$$e_i(C_1) = (a_{12}/a_{11})^2 + (a_{22}/a_{11} - 1)^2. \qquad \text{eq. 6}$$

The resulting cost function of equation 6 exploits well-known orthogonality constraints over the image of the absolute conic and holds for any homography $H_{i,1}$ mapping from the reference camera to another camera i. For a set of cameras $C_i$, all connected with individual homographies $H_{i,1}$ to a reference camera $C_1$, we construct a cost function by summing over all the individual costs, obtaining a single cost function for the unknown reference camera pose $C_1$ $$e(C_1) = \sum_i e_i(C_1). \qquad \text{eq. 7}$$

Overall, the whole problem of estimating all camera poses $C_i$ can be reduced to finding one camera pose $C_1$ that minimizes the total cost function of equation 7.

A homography $H_{2,1}$ between two cameras has 8 degrees of freedom because it is defined up to scale. By fixing the orientation and translation of the second camera $C_2$ with respect to the first camera $C_1$ and allowing only the plane to move freely, the first camera $C_1$ has only two degrees of freedom left. In "Practical planar metric rectification" by A. Ruiz, P. E. L. de Teruel, and L. Fernandez, in In Proc. BMVC, 2006, Edinburgh, UK, Sep. 4-7, 2006, which is incorporated herein by reference, it was observed that the camera pose $C_1$ can be expressed as conjugate rotation in two degrees of freedom, which fixes the position of the horizon, i.e., the line at infinity, in the corresponding camera image. The resulting rotation matrix may be used to perspectively transform the camera image of the plane and synthesize a rectified orthoimage where one can measure right angles and parallel lines. Ruiz et al. proposed to describe the horizon by rotating a fixed-position camera sequentially around the x-axis (tilt angle) and z-axis (roll angle). The 6-DOF camera pose may be composed of the 2-DOF conjugate rotation and a 4-DOF similarity matrix which defines an arbitrary plane coordinate system (orientation, scale, position). FIGS. 6A, 6B, 6C, and 6D illustrate the geometric interpretation of the planar image rectification parameterization. As illustrated in FIGS. 6A and 6D, the plane and reference camera are defined to be located in canonical position, the plane aligning with the world (x,y) plane and the reference camera located at position (0, 0, −1) such that world and camera coordinate systems are aligned. The plane rotates on a unit half-sphere around the reference camera, which remains fixed. As illustrated in FIG. 6A, the first rotation around the x-axis lets the plane move along a circle aligned with the (y,z) camera plane. As illustrated in FIG. 6B, the second rotation lets the plane move along another circle aligned with the (x,y) camera plane. Avoiding the plane to be rotated behind the camera, we define (−π/2, π/2) as the range for the x-rotation parameter. For the z-rotation parameter we define [−π/2, π/2) as the valid range to avoid solution symmetry. The camera remains in canonical position after the rectifying transformation consisting of x- and z-axis rotations, respectively, as illustrated in FIG. 6C. As illustrated in FIG. 6D, the final plane coordinate system is defined by intersecting the camera z-ray with the plane resulting in a similarity transformation.

Properties

We analyzed the cost function of equation 7 and the shape and depth of the resulting 2DOF cost surface. Depending on the selection of reference camera and motion between keyframes various effects were found as described in the following.

The motion encoded in the input homographies was found to considerably influence the depth of the cost surface. For example, when passing a single homography estimated from a fixed camera $C_1$ to a camera $C_2$ with increasing image overlap along a single axis of translation, the cost depth increases linearly with the magnitude of the translation.

Cost depth and motion influence the solution multiplicity of the error function. Generally, it is desirable to find the global minimum of the cost surface which yields a unique 2DOF solution. However, the cost surface regularly shows two local minima which correspond to solutions describing the camera pose in front and behind the plane. Increasing the amount of motion encoded in the homographies lets the local minima vanish in favor of the correct global minimum describing the camera pose in front of the plane.

Degenerate motion cases may be encountered which do not change the cost function and thus do not yield a valid solution. For example, known degenerate motion cases include pure rotation and translation along the plane normal.

Planar Mapping

As discussed above, the mapping component 130 processes keyframe candidates provided by the tracking component 120. Keyframe candidates provide new information about the planar scene that may be used to improve the planar reconstruction and results in refined and extended maps.

Figure 7:
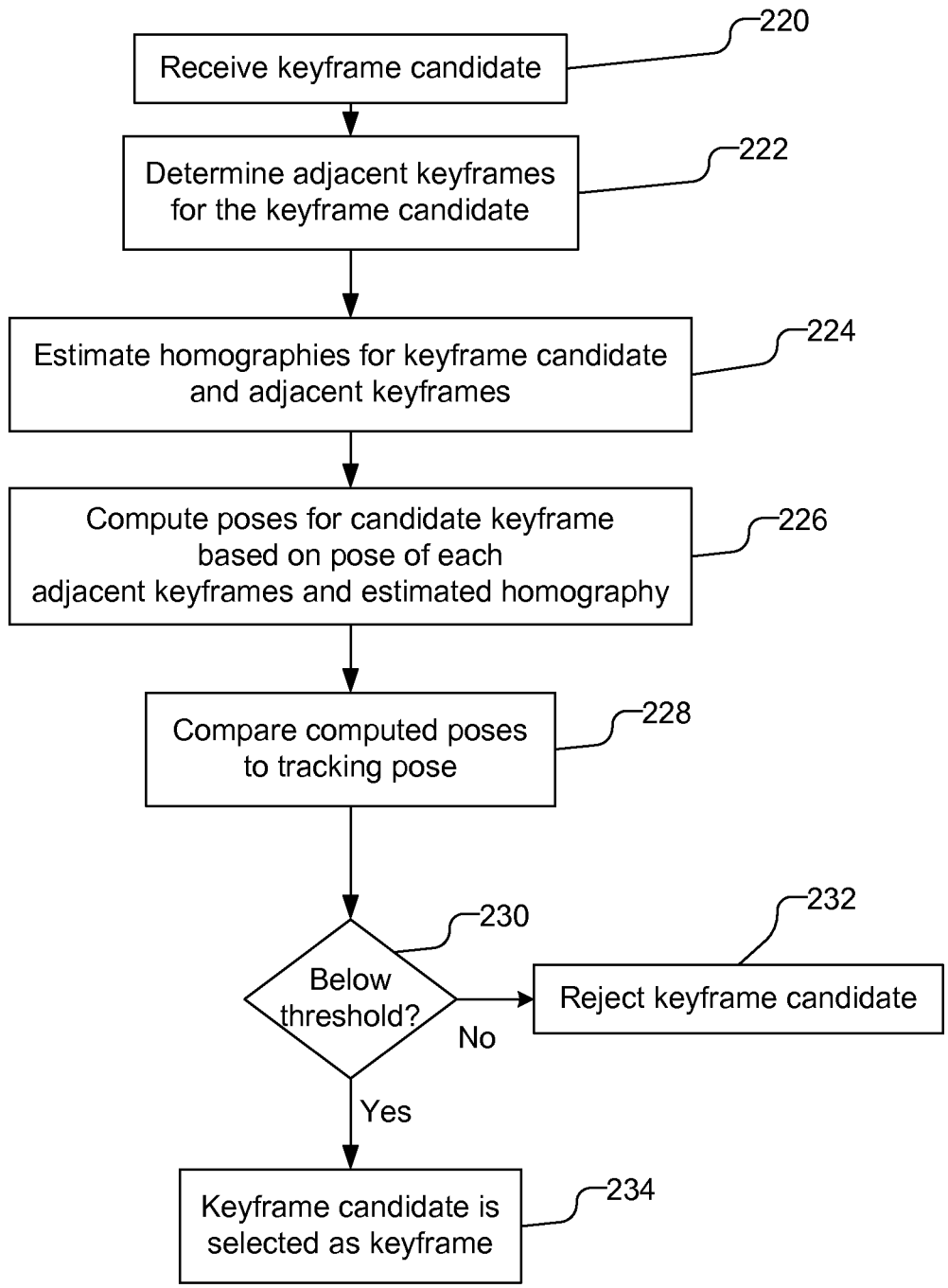
FIG. 7 is a flow chart illustrating a method of selecting a keyframe candidate as a keyframe based on pose consistency.

FIG. 7 is a flow chart illustrating a method of selecting a keyframe candidate as a keyframe based on pose consistency. As illustrated, a keyframe candidate is received (220), e.g., in the keyframe candidate queue 132 from the tracking component 120 (FIG. 2). The adjacent keyframes with respect to the keyframe candidate are determined (222), e.g., based on the amount of overlap. Homographies for the keyframe candidate and the adjacent keyframes are estimated (224) and poses for the candidate keyframe are computed using the pose and estimated homography of each adjacent keyframe (226). The computed poses for the keyframe candidate are compared to the tracking pose (228), e.g., produced by the tracking component 120 in FIG. 2. If the resulting comparison is below a desired threshold (230), the keyframe candidate is selected as a keyframe (232), and otherwise the candidate keyframe is rejected (234).

Adjacent Keyframes

As discussed above, in step 222 in FIG. 7, for each keyframe candidate, a set of adjacent keyframe nodes are selected from the graph with respect to the subsequent homography estimation. For that purpose pairwise image overlap may be computed.

The overlap of a source/target keyframe pair is computed by projecting the image corners of the source keyframe onto the target keyframe with a homography. The homography is derived from the known keyframe poses. The resulting four-point polygons are intersected and unified resulting in another two polygons. The desired overlap is the ratio r(A,B) of these polygon areas:

$$r(A, B) = \frac{\text{area}(A \cap B)}{\text{area}(A \cup B)}. \qquad \text{eq. 8}$$

A given candidate keyframe is paired with each of the existing keyframes in the graph, resulting in a corresponding list of overlap ratios. The actual selection may be done by sorting the resulting list into descending overlap ratios and retrieving a limited set of keyframes (e.g. five) from the front of the list resulting in the adjacent keyframe set.

Pose Consistency Check

Combining the candidate keyframe with the previously selected adjacent keyframe set, pairwise homographies are estimated in both directions, as referred to in step 224 in FIG. 7. By way of example, a RANSAC (RANdom SAmple Consensus) algorithm may be used for robust estimation. Resulting homographies may be induced by planes that conflict with the currently mapped plane. Estimation errors might occur, e.g. from poor image overlap, uneven feature distribution, or low correspondence count (due to high noise or outliers).

Figure 8:
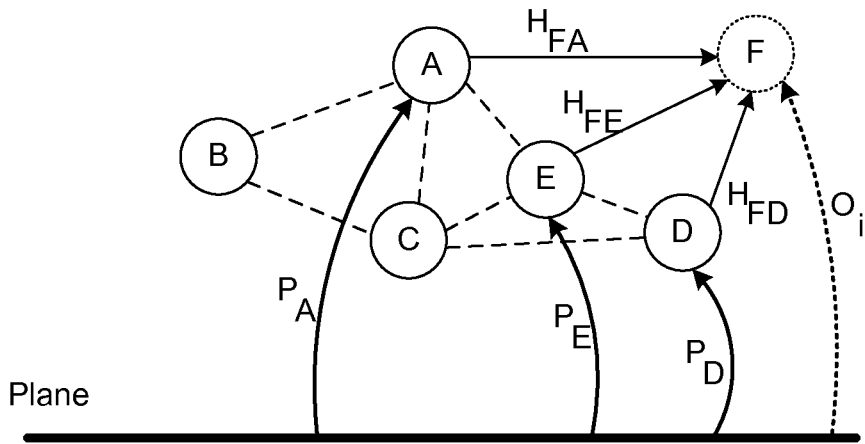
FIG. 8 illustrates a pose graph similar to that shown in FIG. 5, but includes a keyframe candidate F.

Thus, it is desirable to detect candidate keyframes that feature erroneous homographies by comparing the tracker pose provided by tracking component 120 for the candidate keyframe with pose observations computed from the adjacent keyframes poses and estimated homographies. For each adjacent keyframe $I_i$, the pose $O_i$ for the keyframe candidate is computed by combining the pose of the adjacent keyframe with the corresponding homography (step 226 in FIG. 7). FIG. 8, by way of example, illustrates a pose graph similar to that shown in FIG. 5, but includes a candidate keyframe F. The pose $O_A$ of the candidate keyframe F is calculated based on the pose $P_A$ and homography $H_{FA}$ for keyframe A, the pose $O_E$ is calculated based on the pose $P_E$ and homography $H_{FE}$ for keyframe E, and the pose $O_D$ is calculated based on the pose $P_D$ and homography $H_{FD}$ for keyframe D. The position difference for the pose $O_i$ to the candidate camera pose position P obtained from the planar tracking component 120 (step 228 in FIG. 7) may be determined as:

$$err = \sqrt{\sum_i \|O_i - P\|^2} . \qquad \text{eq. 9}$$

If the resulting RMS error is below a desired threshold (step 230 in FIG. 7), the keyframe candidate is selected as a keyframe (step 232 in FIG. 7) and the estimated homographies are inserted in the graph as node and edges respectively; otherwise, the keyframe candidate is rejected (step 234 in FIG. 7).

Reconstruction

The planar reconstruction procedure incorporates the initialization and refinement of keyframe camera poses and map points. Keyframe camera poses are computed with respect to a selected reference keyframe pose which is re-evaluated by the plane estimation algorithm using homographies retrieved from the graph. Map points are computed from the image observations associated with each map point.

Figure 9:
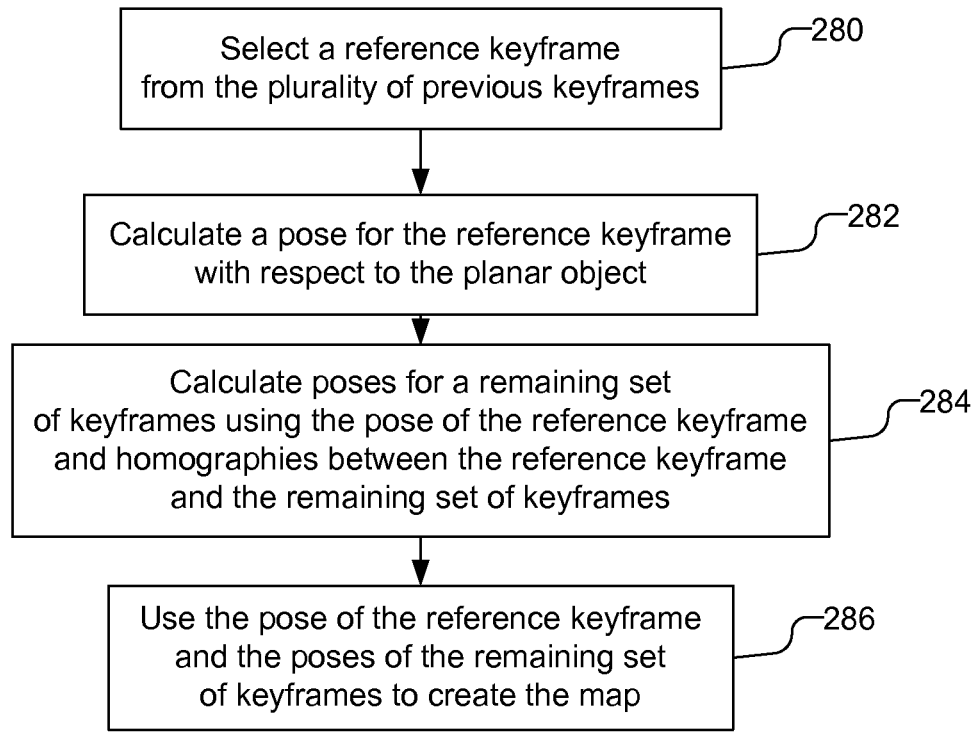
FIG. 9 illustrates a method of creating a map using the graph structure that includes the node (pose) and edges (homographies) for the new keyframe.

FIG. 9 illustrates a method of creating a map using the graph structure that includes the node (pose) and edges (homographies) for the new keyframe. With the graph structure generated, including the node (pose) and edges (homographies) for the new keyframe, a map of the imaged planar object is created using the graph structure (step 210 in FIG. 4), as illustrated in FIG. 9. After a new keyframe is added, a reference keyframe is selected from the plurality of previous keyframes (280). A pose for the reference keyframe is calculated with respect to the planar object (282). The poses for a remaining set of keyframes are calculated using the pose of the reference keyframe and homographies between the reference keyframe and the remaining set of keyframes (284). The pose of the reference keyframe and the poses of the remaining set of keyframes are used to create the map (286).

Reference Keyframe Selection

The selection of the reference keyframe (step 280) has a considerable impact on the overall quality of the reconstruction since all keyframes poses are computed with respect to the reference keyframe.

For the selection of the reference keyframe, different approaches may be used based on the structure of the pose graph which results from the actual camera trajectory at runtime. If the pose graph shows a clear center node, it may be used as the reference keyframe. Otherwise a leading node close the frontal (latest) keyframe may be superior. Subsequently, the pose graph is used to retrieve homography paths between keyframe nodes. The homographies are employed for the reference keyframe estimation and map creation. In both cases, one may want to minimize the overall error induced by the (composed) homographies, e.g. by minimizing the homography path depths since homography errors accumulate along the path.

For both approaches, scoring functions may be implemented which are parameterized with values retrieved from breath-first graph operations. To decide whether the pose graph has a clear center node or not, one may use the well-known Freeman network centralization measure. The node having the maximum centrality measure is computed and compared against the theoretical maximum. If the resulting ratio exceeds a predetermined threshold, one may use the maximum-measure node as the reference keyframe. Alternatively, a graph node with the minimum path depth from the latest keyframe node minus some variable offset (e.g. two) may be used.

Reference Pose Estimation

With the selection of a reference keyframe, the plane estimation algorithm is initialized with a set of input homographies and all keyframe poses are subsequently recalculated with respect to the updated camera pose of the reference keyframe.

Figure 10A:
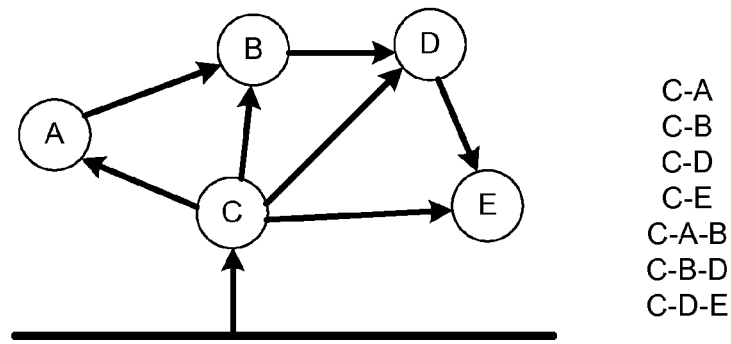
FIGS. 10A and 10B illustrate different approaches to homography retrieval operations for plane estimation and pose update.
Figure 10B:
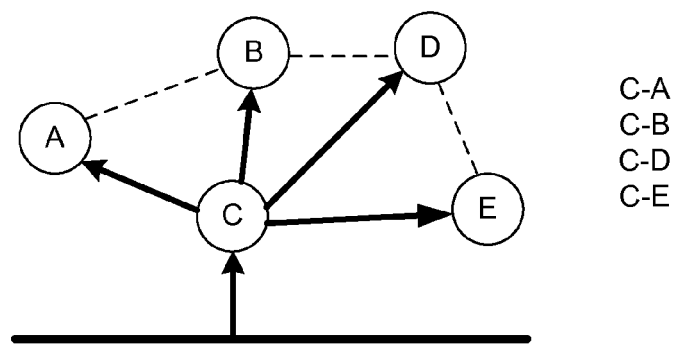

FIGS. 10A and 10B illustrate homography retrieval operations for plane estimation and pose update. The plane estimation algorithm may use different homography retrieval approaches. One approach aims to maximize the motion encoded in the input homographies and delivers redundancy such that single erroneous homographies do not corrupt the rectification algorithm cost surface. As illustrated in FIG. 10A, for a given root node C, the paths to all other nodes which contain all edges (in either direction) of the graph are retrieved. Incorporating a maximum number of edges assures a high amount of motion and provides multiple paths to target nodes, e.g., node E, such that composed homographies containing individual erroneous homographies are compensated for. In another approach, illustrated in FIG. 10B, not all graph edges are incorporated but the shortest paths from the reference keyframe C to all other keyframes are retrieved.

We obtain the pose of the reference keyframe by minimizing the cost function in equation 7 with the retrieved homography paths (step 282 in FIG. 9). For a given set of homographies, a single best available solution may be computed. Depending on the solution multiplicity, the best solution may be the unique global minimum or in case of solution ambiguity, a selected best minimum from the set of local minima. In rare degenerate cases the algorithm may not yield a valid solution at all.

To minimize the cost function, the cost surface is sampled discretely (e.g. each 10 deg in each parameter dimension) and the set of sample minima is computed by simply comparing sampled cost values with their neighbors. From the set of sample minima, the set of local minima is computed. Each sample minimum is refined with a Nelder-Mead downhill simplex solver to find the optimized parameters. Resulting local minima which feature parameters outside of the valid ranges are discarded. Furthermore, local minima is compared pairwise and duplicates discarded. Due to numerical imprecision, the potential global minimum could be discarded in the validity step. The existence of the global minimum is checked by comparing all local minima with the sampled minima having the least cost. If a local minimum having less cost cannot be found, the least-cost sample minimum is added to the local minima set.

Map Creation

At this point of the reconstruction, the pose of the reference keyframe with respect to the plane is known. The remaining keyframe poses are computed by multiplying the reference pose with inter-keyframe homographies (step 284 in FIG. 9). The map creation is completed by reevaluating the map points (step 286 in FIG. 9).

Keyframe Pose Update

Keyframe poses $P_k$ are computed by multiplying the reference pose homography $C_r$ resulting from the plane estimation algorithm with a homography $H_{k,r}$ to obtain the keyframe pose homography $C_k$. The full pose $P_k$ is then recovered through calculating the 3rd column of the rotation matrix. Additionally, a similarity transformation S may be applied which moves the plane coordinate system origin into the back-projected principle point of the first keyframe:

$$C_k = H_{k,r} C_r S. \qquad \text{eq. 10}$$

For the retrieval of the homography $H_{k,r}$, the shortest path from reference to keyframe may be calculated using breadth first search.

Point Evaluation

Map point locations are assigned the centroid of its back-projected keyframe image observations using the corresponding keyframe camera poses. Gross outlier observations are detected by calculating the mean distance of the observations to the centroid and discarding observations which are outside a certain threshold (e.g. two times the mean distance). In such cases, the centroid is re-evaluated using the inlier observations only.

Planar Tracking

Figure 11:
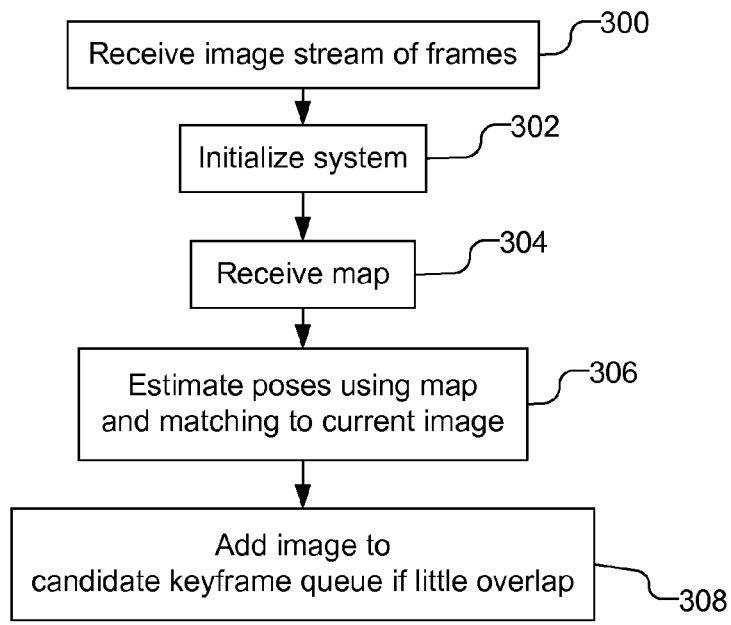
FIG. 11 is a flow chart of a method of tracking a camera pose relative to a planar point map.

FIG. 11 is a flow chart of a method of tracking a camera pose relative to a planar point map. The tracking component 120 processes the captured images from the incoming image stream from the calibrated monocular camera 110 and computes a camera pose relative to the planar point map provided by the mapping component 130. Thus, as illustrated in FIG. 11, an image stream is received (300). At system startup, the map does not yet exist and accordingly the system is initialized (302), e.g., using two keyframes. Once the system is initialized, the map is received (304) from the mapping component 130 and poses are estimated using points from the map and matching them with the current image (306). Camera poses are estimated using a motion model and a robust pose refiner. If an image produces a good pose with little overlap with existing keyframes, the image is added the candidate keyframe queue (308). Thus, candidate keyframe are selected by the tracking component 120 and passed to the mapping component 130 resulting in extended and refined maps.

Initialization

The mapping and tracking system is initialized (step 300 in FIG. 11), e.g., by a user who may select a first keyframe manually. For example, the first keyframe may be the first image frame when the mapping and tracking application is initiated by the user. Alternatively, the user may select a desired first keyframe by touching the touch screen display 102 after the mapping and tracking application has been initiated. Homographies between the keyframe and a current input image are continuously estimated. Additionally, each homography is passed to the image rectification algorithm discussed above and pose estimates are produced for the current image with respect to the first keyframe.

Homography Estimation

Keyframes feature a fixed set of salient image measurements on different image scale levels. For example, a low-pass image pyramid with three levels may be generated to improve scale invariance. On each pyramid level, a FAST (Features from Accelerated Segment Test) corner detector may be applied to generate a set of corner measurements. Other methods for extracting keypoints may be used, such as SIFT, or Speeded-up Robust Features (SURF), or any other desired method. The keypoint count may be limited to restrict the subsequent computational cost, e.g. by filtering FAST features with low scores.

A robust RANSAC estimation algorithm may be used for homography estimation from 2D-2D point correspondences between the source keyframe (i.e., the first keyframe) and the target keyframe (i.e., the current keyframe). For each image level (going from coarsest to finest), we iterate the salient image measurements provided by the source keyframe and compute match correspondences in the target keyframe. After each level, the homography is refined with the added level point correspondences. The RANSAC outlier threshold may be set in relation to the known internal camera parameters.

Point correspondences may be computed with a sub-pixel accurate affine patch matching algorithm by active search over a search window with normalized cross correlation (NCC). Given two images and an initial homography, a local 1×1 pixel coordinate system is established at the source point location in the source image. A local affine warping matrix may be generated by projecting the local coordinate system into the target image. After adjusting the source image level, an 8×8 patch is sampled from the source image which is correlated with the target image over a search window with given radius (e.g. 3-5 pixels) using NCC as the error measure. If the NCC value of a target image point is above a certain threshold (e.g. >0.9), source and target points may be considered correlated.

Initial Map

With the automatic selection of a second keyframe, the mapping component 130 computes an initial map from the resulting keyframe pair and corresponding homography. The second keyframe is selected based on image overlap and the plane estimate quality. If image overlap between first keyframe and current image exceeds a certain threshold (e.g. 0.75) and the rectification algorithm yields a valid and non-ambiguous plane estimate using the first keyframe as reference, the second keyframe is selected and the map initialized.

Map initialization comprises the estimation of the homography from second to first keyframe, the pose estimation for both keyframes and the population of the map with points back-projected from the keyframes. Map point locations are defined by the centroid of the back-projected associated image observations. The world coordinate system origin is defined by back-projecting the principle point of the first keyframe image. Additionally, the initial graph is set up by adding the first and second keyframes as nodes and their homographies as edges.

Map Tracking

After the creation of the initial planar map, the tracking component 120 receives the map (304 in FIG. 11) and estimates camera poses using points from the map and matches them with the current image (306). Additionally, keyframes are selected from the image stream and passed to the mapping component 130.

Pose Estimation

The tracking component 120 robustly estimates a 6-DOF camera pose relative to the planar map provided by the mapping component 130. A constant decaying motion model predicts the pose of the current image based on previous pose observations. The motion model pose is used to initialize a camera frustum which is used to discard map points invisible to the current image. Remaining map points are projected into the current image using the predicted pose, resulting in the visible point set.

Point matching is consecutively executed for each image level starting at the coarsest level using normalized cross correlation. After completing a level, the matched level correspondences are added to the salient point set and a pose refinement step is performed. The employed pose refinement algorithm aims to minimize the reprojection error using a robust Tukey M-estimator to discard outliers. The inlier point set of the resulting pose may be computed from the salient input point set by partitioning the corresponding Tukey M-estimator weights with a predefined threshold.

After completing point matching on all levels, the validity and quality of the resulting pose is checked. Pose quality may be defined by the ratio of salient vs. inlier feature count. If the ratio is above a certain threshold, e.g. >0.75, is it considered good, if it is below a certain threshold, e.g. <0.5, it is considered bad, otherwise it is considered medium. If the pose estimator indicates an invalid pose, e.g. because of too little point correspondences, a relocalization mode may be used. One possible relocalization mode may be to compute and match SIFT feature descriptors of the current image with a database containing descriptors of map features and trying to estimate a pose with the resulting correspondences.

Keyframe Selection and Map Update

Keyframe candidates may be selected based on current pose quality and image overlap from the image stream. Only images that yield pose estimates with good quality, as discussed above, are considered as keyframes. If no existing keyframe or candidate keyframe from the candidate keyframe queue is found that overlaps the current image sufficiently, e.g. the maximum overlap ratio is below 0.75 or 0.60, the current image is pushed onto the keyframe candidate queue processed by the mapping component 130 (step 308). The overlap parameter may affect the map data volume and thus on the overall system performance. With increasing overlap, the number of keyframes steadily increases resulting in a denser sampling of the 3D space. In turn, candidate keyframes feature more adjacent keyframes allowing the estimation of more homographies and influencing the connectivity of the graph. However, the overlap parameter appears to yields no significant effect on accuracy. Surprisingly, more data neither improves object space nor reprojection error significantly. A 60% overlap appears to provide sufficient data to solve the planar reconstruction in good quality with reprojection error below 3 pixels and object space error below 1.5% of the trajectory sizes.

The mapping component 130 indicates the completion of a refined map by setting a corresponding flag. Since refined maps might change considerably, e.g. due to a change in the reference keyframe, the correspondences from, e.g., the last two images are stored and their poses with respect to the new map are re-estimated. The motion model may then be updated from these new poses.

Figure 12:
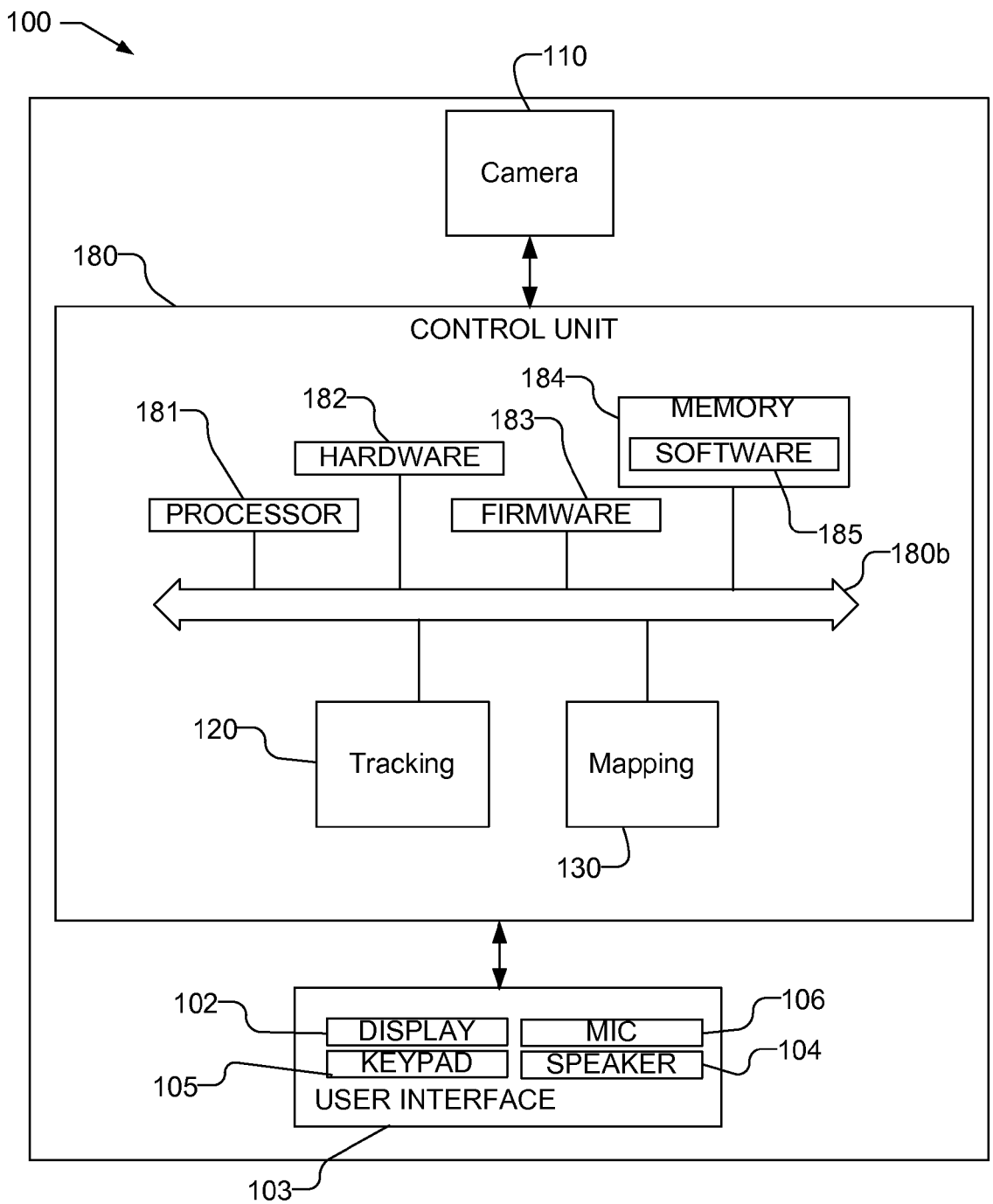
FIG. 12 is a block diagram of a mobile device capable of pose tracking and mapping using captured images, as discussed above.

FIG. 12 is a block diagram of a mobile device 100 capable of pose tracking and mapping using captured images, as discussed above. The mobile device 100 includes a calibrated monocular camera 110. The mobile device 100 may further includes a user interface 103 that includes a display 102, a keypad 105 or other input device through which the user can input information into the mobile device 100. If desired, the keypad 105 may be obviated by integrating a virtual keypad into the display 102 with a touch sensor. The user interface 103 may also include a microphone 106 and speaker 104, e.g., if the mobile device 100 is a mobile device such as a cellular telephone. Of course, mobile device 100 may include other elements unrelated to the present disclosure.

The mobile device 100 also includes a control unit 180 that is connected to and communicates with the camera 110. The control unit 180 may be provided by a bus 180b, processor 181 and associated memory 184, hardware 182, software 185, and firmware 183. The control unit 180 includes the tracking component 120 and mapping component 130 that operate as discussed above. The tracking component 120 and mapping component 130 are illustrated separately and separate from processor 181 for clarity, but may be a single unit, combined units and/or implemented in the processor 181 based on instructions in the software 185 which is run in the processor 181. It will be understood as used herein that the processor 181, as well as one or more of the tracking component 120 and mapping component 130 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The mobile device includes means for capturing multiple images of a planar object which may be, e.g., the camera 110. Means for selecting a new image as a new keyframe may include the tracking component 120. Means for calculating homographies between the new keyframe and each of a plurality of previous keyframes for the planar object that are spatially distributed may be the mapping component 130. Means for generating a graph structure using the new keyframe and each of the plurality of previous keyframes and the homographies between the new keyframe and each of the plurality of previous keyframes may be the mapping component 130. Means for using the graph structure to create a map of the planar object may include the mapping component 130. Means for tracking the planar object based on the map and subsequently captured images may include the tracking component 120.

The methodologies described herein may be implemented by various means depending upon the application. For example, these methodologies may be implemented in hardware 182, firmware 163, software 185, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 184 and executed by the processor 181. Memory may be implemented within or external to the processor 181. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing multiple images of a planar object;
   selecting a new image as a new keyframe;
   calculating homographies between the new keyframe and each of a plurality of previous keyframes for the planar object that are spatially distributed;
   generating a graph structure using the new keyframe and each of the plurality of previous keyframes and the homographies between the new keyframe and each of the plurality of previous keyframes;
   using the graph structure to create a map of the planar object; and
   tracking the planar object based on the map and subsequently captured images.

2. The method of claim 1, wherein the graph structure is a tree based graph structure and the new keyframe and each of the plurality of previous keyframes are nodes and the homographies between the new keyframe and each of the plurality of previous keyframes are edges between the nodes.

3. The method of claim 1, wherein using the graph structure to create the map of the planar object comprises:
   selecting a reference keyframe from the plurality of previous keyframes;
   calculating a pose for the reference keyframe with respect to the planar object;
   calculating poses for a remaining set of keyframes using the pose of the reference keyframe and homographies between the reference keyframe and the remaining set of keyframes; and
   using the pose of the reference keyframe and the poses for the remaining set of keyframes to create the map.

4. The method of claim 3, wherein the reference keyframe is selected based on one of closeness to the new keyframe and closeness to a center node of the graph structure.

5. The method of claim 1, wherein selecting the new image as the new keyframe comprises comparing the new image to the plurality of previous keyframes to determine an overlap of the new image with the plurality of previous keyframes and comparing the overlap to a threshold.

6. The method of claim 1, wherein selecting the new image as the new keyframe comprises verifying that the new image is of the planar object.

7. The method of claim 6, wherein verifying that the new image is of the planar object comprises:
   determining multiple poses for the new image based on poses of adjacent keyframes and corresponding homographies between the new image and the adjacent keyframes;
   comparing the multiple poses to a tracker pose for the new image produced from tracking the new image with respect to the map; and
   determining a sum of pairwise pose differences between the multiple poses and the tracker pose is within a threshold indicating that the new image is of the planar object.

8. An apparatus comprising:
   a camera capable of capturing multiple images of a planar object; and
   a processor coupled to the camera, the processor configured to select a new image as a new keyframe, calculate homographies between the new keyframe and each of a plurality of previous keyframes for the planar object that are spatially distributed, generate a graph structure using the new keyframe and each of the plurality of previous keyframes and the homographies between the new keyframe and each of the plurality of previous keyframes, use the graph structure to create a map of the planar object, and track the planar object based on the map and subsequently captured images.

9. The apparatus of claim 8, wherein the graph structure is a tree based graph structure and the new keyframe and each of the plurality of previous keyframes are nodes and the homographies between the new keyframe and each of the plurality of previous keyframes are edges between the nodes.

10. The apparatus of claim 8, wherein the processor is configured to use the graph structure to create the map of the planar object by being configured to select a reference keyframe from the plurality of previous keyframes, calculate a pose for the reference keyframe with respect to the planar object, calculate poses for a remaining set of keyframes using the pose of the reference keyframe and homographies between the reference keyframe and the remaining set of keyframes, and use the pose of the reference keyframe and the poses for the remaining set of keyframes to create the map.

11. The apparatus of claim 10, wherein the processor is configured to select the reference keyframe based on one of closeness to the new keyframe and closeness to a center node of the graph structure.

12. The apparatus of claim 8, wherein the processor is configured to select the new image as the new keyframe by being configured to compare the new image to the plurality of previous keyframes to determine an overlap of the new image with the plurality of previous keyframes and compare the overlap to a threshold.

13. The apparatus of claim 8, wherein the processor is configured to select the new image as the new keyframe by being configured to verify that the new image is of the planar object.

14. The apparatus of claim 13, wherein the processor is configured to verify that the new image is of the planar object by being configured to determine multiple poses for the new image based on poses of adjacent keyframes and corresponding homographies between the new image and the adjacent keyframes, compare the multiple poses to a tracker pose for the new image produced from tracking the new image with respect to the map, and determine a sum of pairwise pose differences between the multiple poses and the tracker pose is within a threshold indicating that the new image is of the planar object.

15. An apparatus comprising:
means for capturing multiple images of a planar object;
means for selecting a new image as a new keyframe;
means for calculating homographies between the new keyframe and each of a plurality of previous keyframes for the planar object that are spatially distributed;
means for generating a graph structure using the new keyframe and each of the plurality of previous keyframes and the homographies between the new keyframe and each of the plurality of previous keyframes;
means for using the graph structure to create a map of the planar object; and
means for tracking the planar object based on the map and subsequently captured images.

16. The apparatus of claim 15, wherein the graph structure is a tree based graph structure and the new keyframe and each of the plurality of previous keyframes are nodes and the homographies between the new keyframe and each of the plurality of previous keyframes are edges between the nodes.

17. The apparatus of claim 15, wherein the means for using the graph structure to create the map of the planar object comprises:
means for selecting a reference keyframe from the plurality of previous keyframes;
means for calculating a pose for the reference keyframe with respect to the planar object;
means for calculating poses for a remaining set of keyframes using the pose of the reference keyframe and homographies between the reference keyframe and the remaining set of keyframes; and
means for using the pose of the reference keyframe and the poses for the remaining set of keyframes to create the map.

18. The apparatus of claim 15, wherein the means for selecting the new image as the new keyframe comprises means for comparing the new image to the plurality of previous keyframes to determine an overlap of the new image with the plurality of previous keyframes and means for comparing the overlap to a threshold.

19. The apparatus of claim 15, wherein the means for selecting the new image as the new keyframe comprises means for verifying that the new image is of the planar object.

20. The apparatus of claim 19, wherein the means for verifying that the new image is of the planar object comprises:
means for determining multiple poses for the new image based on poses of adjacent keyframes and corresponding homographies between the new image and the adjacent keyframes;
means for comparing the multiple poses to a tracker pose for the new image produced from tracking the new image with respect to the map; and
means for determining a sum of pairwise pose differences between the multiple poses and the tracker pose is within a threshold indicating that the new image is of the planar object.

21. A non-transitory computer-readable medium including program code stored thereon, comprising:
program code to select from captured multiple images of a planar object a new image as a new keyframe;
program code to calculate homographies between the new keyframe and each of a plurality of previous keyframes for the planar object that are spatially distributed;
program code to generate a graph structure using the new keyframe and each of the plurality of previous keyframes and the homographies between the new keyframe and each of the plurality of previous keyframes;
program code to use the graph structure to create a map of the planar object; and
program code to track the planar object based on the map and subsequently captured images.

22. The non-transitory computer-readable medium of claim 21, wherein the graph structure is a tree based graph structure and the new keyframe and each of the plurality of previous keyframes are nodes and the homographies between the new keyframe and each of the plurality of previous keyframes are edges between the nodes.

23. The non-transitory computer-readable medium of claim 21, wherein the program code to use the graph structure to create the map of the planar object comprises:
program code to select a reference keyframe from the plurality of previous keyframes;
program code to calculate a pose for the reference keyframe with respect to the planar object;
program code to calculate poses for a remaining set of keyframes using the pose of the reference keyframe and homographies between the reference keyframe and the remaining set of keyframes; and
program code to use the pose of the reference keyframe and the poses for the remaining set of keyframes to create the map.

24. The non-transitory computer-readable medium of claim 21, wherein the program code to select the new image as the new keyframe comprises program code to compare the new image to the plurality of previous keyframes to determine an overlap of the new image with the plurality of previous keyframes and program code to compare the overlap to a threshold.

25. The non-transitory computer-readable medium of claim 21, wherein the program code to select the new image as the new keyframe comprises program code to verify that the new image is of the planar object.

26. The non-transitory computer-readable medium of claim 25, wherein the program code to verify that the new image is of the planar object comprises:
program code to determine multiple poses for the new image based on poses of adjacent keyframes and corresponding homographies between the new image and the adjacent keyframes;
program code to compare the multiple poses to a tracker pose for the new image produced from tracking the new image with respect to the map; and
program code to determine a sum of pairwise pose differences between the multiple poses and the tracker pose is within a threshold indicating that the new image is of the planar object.

* * * * *